United States Patent [19]

Gardner

[11] 4,072,014
[45] Feb. 7, 1978

[54] CONTROL MEANS FOR A TWO STAGE SERVOMOTOR

[75] Inventor: Delbert J. Gardner, South Bend, Ind.

[73] Assignee: The Bendix Corporation, South Bend, Ind.

[21] Appl. No.: 669,133

[22] Filed: Mar. 22, 1976

[51] Int. Cl.$^2$ .......................... B60T 11/08; F15B 7/04
[52] U.S. Cl. ........................................ 60/575; 60/553; 60/562; 60/588; 91/369 A
[58] Field of Search ................. 60/547, 562, 574, 575, 60/576, 577, 588, 589, 553; 251/331; 137/625.3; 91/391 R, 391 A, 369 A

[56] References Cited

U.S. PATENT DOCUMENTS

| | | | |
|---|---|---|---|
| 3,559,406 | 2/1971 | Gardner | 60/553 |
| 3,727,623 | 4/1973 | Robbins | 251/331 |
| 3,910,048 | 10/1975 | Gardner | 60/568 |
| 3,911,681 | 10/1975 | Sisco | 60/553 |
| 3,972,191 | 8/1976 | Grabb | 60/553 |

Primary Examiner—Martin P. Schwadron
Assistant Examiner—Abraham Hershkovitz
Attorney, Agent, or Firm—Leo H. McCormick, Jr.; Ken C. Decker

[57] ABSTRACT

The control valve for a two stage servomotor used in a braking system. A two stage servomotor has a housing with a stepped bore therein for retaining a piston and a cylindrical body. A deformable member adjacent the cylindrical body transmits a first operational input into the piston. A first operational input moves the piston and produces a pressure signal. The first operational input and the resistance to movement by the piston changes the shape of the deformable member. The changes in the shape of deformable member moves the control valve and allows the pressure signal to be communicated to the cylindrical body. The pressure signal acting on the cylindrical body provides an additional second operational force for moving the piston.

16 Claims, 3 Drawing Figures

CONTROL MEANS FOR A TWO STAGE SERVOMOTOR

BACKGROUND OF THE INVENTION

In U.S. Pat. No. 3,559,406, incorporated herein by reference, I disclosed a servomotor for a braking system having concentric pistons located in a pressurizing chamber for sequentially producing first and second operational braking forces. A pressure differential responsive wall in the servomotor moves the concentric pistons simultaneously until an optimum pressure differential develops within the servomotor. Thereafter, a manual input applied to the concentric pistons provides an additional pressurization force for moving the pistons in the pressurizing chamber. Unfortunately, the additional pressurizing forces acts on all the concentric pistons thereby reducing the effect of the manual input.

Later, in U.S. Pat. No. 3,910,048, I disclosed a two stage servomotor having a locking means for holding an exterior concentric piston in a stationary position during a transfer of a manual operational input to an interior piston. A valve in the exterior piston allows fluid to flow to the back side of the exterior piston during the simultaneous movement of the concentric pistons. The manual input from the operator moves the interior piston away from the exterior piston and allows a spring to close a flow-through valve. With the flow-through valve closed, the fluid on the back side of the exterior piston resists expansion of the pressurizing chamber thereby essentially eliminating any loss of pressurization through the manual input.

SUMMARY OF THE INVENTION

I have now devised a two stage servomotor having a control valve means for diverting a portion of the output of a piston means to a cylindrical means as a function of a change in shape of a reaction means. The piston means is located in a first bore to establish a first chamber. The reaction means is located between a cylindrical means and the piston means. The cylindrical means is located in a larger second bore to establish a reservoir chamber and a second chamber. A sleeve actuator means is held against the reaction means by a first resilient means. The sleeve actuator means has a first passageway which connects the first pressurizing chamber with a control chamber. The control chamber is connected to the second chamber through a second passageway and to the reservoir chamber through a third passageway in the piston means. A poppet valve is held against a shoulder on the sleeve actuator means by a second resilient means to prevent communication through the first passageway in a first stage of operation.

In the first stage of operation, a first input force is carried through the cylindrical means and into the reaction means for moving the piston means and establishing an operational pressure force. As the operational pressure force develops, the shape of the reaction means proportionally changes to reflect the relationship between the first input force and the operational pressure force. The changes in shape causes the sleeve actuator means to move within the first chamber. Movement of the sleeve actuator means allows a second resilient means to seat a poppet on the piston means and prevent communication between the control chamber and the reservoir chamber. Thereafter any further input force from the the operator causes an additional change in the shape of the reaction means. This additional change in shape moves the sleeve actuator means away from the poppet valve and allows communication of the operational fluid from the first chamber into the second chamber. The operational fluid in the second chamber which acts on the cylindrical means is combined with a second input force from the operator to provide the piston means with a combined input force for further pressurizing fluid in the pressurizing chamber to meet an operational braking demand.

It is therefore the object of this invention to provide a two stage servomotor with a control valve means having an actuator which responds to dimensional changes in the shape of a reaction means for controlling the transfer of a pressure signal from a pressurizing chamber to an input chamber. The pressure signal in the input chamber acts on an input member to provide a combined input force for pressurizing fluid in the pressurizing chamber to meet a braking demand.

It is another object of this invention to provide a power braking system having a two stage servomotor with a control means for diverting a portion of a pressure signal derived by movement of a piston means by a first input force from a first chamber to a second chamber. The pressure signal in the second chamber acts on a cylindrical input member to provide the piston means with an additional motive force for further developing the pressure signal.

It is a further object of this invention to provide a two stage servomotor with an actuator means responsive to changes in the shape of a reaction means for shifting the operation of the servomotor from a first stage to the second stage.

It is a still further object of this invention to provide a two stage servomotor with a reaction means through which all the operational input forces are transmitted to move a piston which energizes the wheel brakes in a braking system.

These and other objects will become apparent from reading this specification and viewing the drawings.

DETAILED DESCRIPTION OF THE PREFERRED EMBODIMENT

Figure 1:
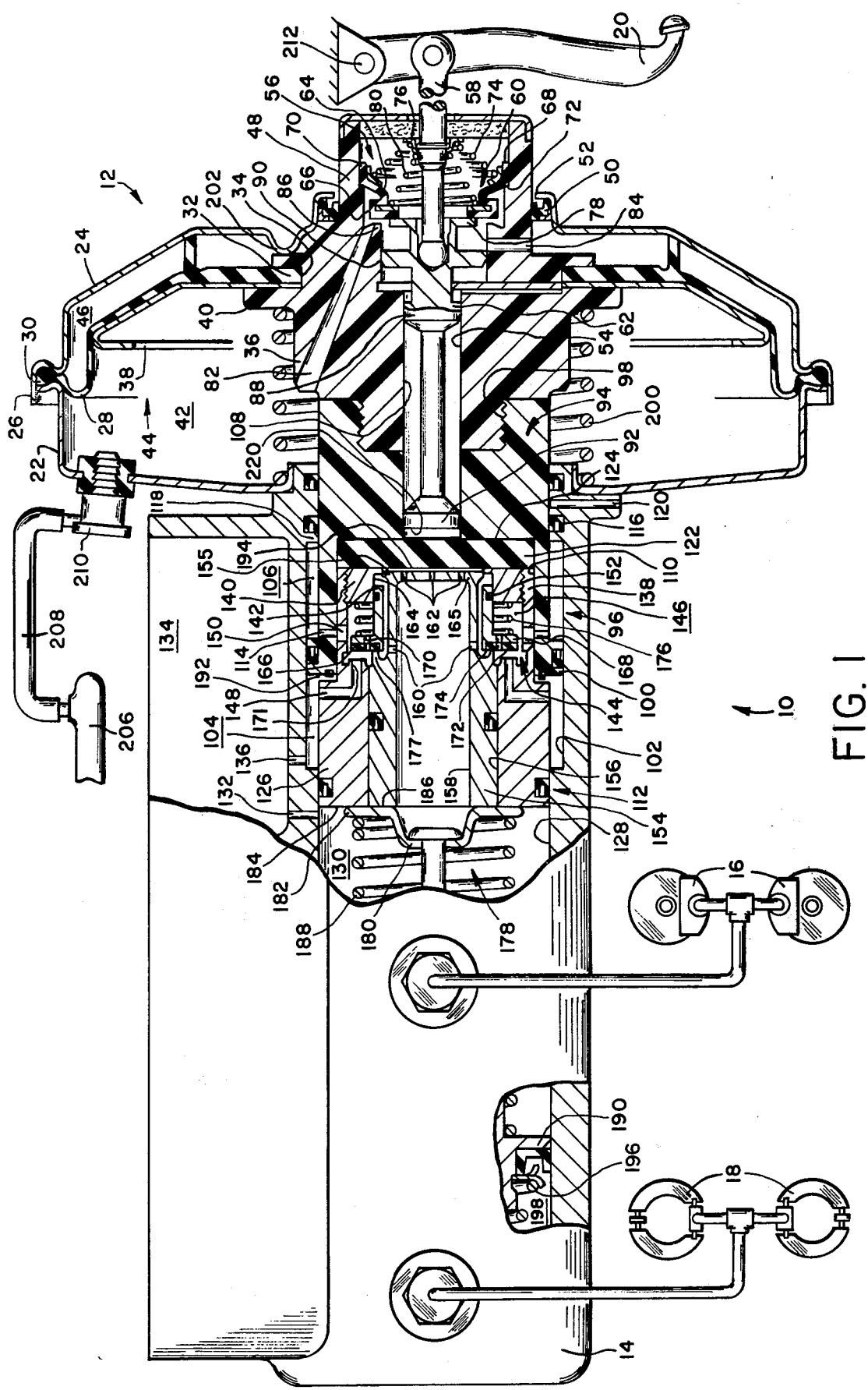
FIG. 1 is a schematic illustration of a braking system having a two stage servomotor made according to the teachings of my invention.

The braking system 10 shown in FIG. 1 has a two stage servomotor 12 connected to a master cylinder 14 which supplies the front wheel brakes 16 and the rear wheel brakes 18 with an operational braking force in response to an input force applied to pedal 20 by an operator.

The two stage servomotor 12 has a front shell 22 joined to a rear shell 24 by a bayonet type twist lock arrangement 26. A diaphragm 28 has a first bead 30, held between the front shell 22 and the rear shell 24 by the twist lock arrangement 26, and a second bead 32 located in groove 34 of a hub means 36. The bead 32 of the diaphragm 28 holds a support plate 38 against shoulder 40 of the hub means 36. The diaphragm 28 and the backing plate 38 form the wall means 44 which separates the interior of the two stage servomotor 12 into a first variable volume chamber 42 and a second variable volume chamber 46.

The hub means 36 has a rearwardly extending projection 48 which is carried by a bearing seal 50 located in axial opening 52 of the rear shell 24. The hub means 36 has a stepped axial bore 54 in which a control valve means 56 is located.

The control valve means 56 includes a push rod 58 which is attached to the pedal 20, a poppet valve means 60 and a plunger 62. The poppet valve means 60 has a flexible section 64 located between a vacuum seat 66 and a retainer bead 68. A clip 70 which holds the retainer bead 68 against shoulder 72 positions the poppet valve means 60 in the axial bore 54. A first spring 74 positioned on clip 70 engages retainer 76 on push rod 58 to hold atmospheric seat 78 against the vacuum seat 66. A second spring 80 positioned on retainer 76 engages and holds the vacuum seat 66 against the atmospheric seat 78 on the plunger 62.

The hub means 36 has a first passage 82, which communicates the first variable volume chamber 42 with the bore 54, and a second passage 84, which communicates the bore 54 with a second variable volume chamber 46. An annular shoulder 86 located between passages 82 and passage 84 in bore 54 provides a vacuum seat 66 for the poppet valve means 60. The plunger 62 has a first bearing surface 88 and a second bearing surface 90 for holding the atmospheric seat 78 substantially perpendicular to the bore 54. The plunger 62 has a third bearing surface 92 which extends into the cylindrical means 94 of the ratio changer means 96 in the two stage servomotor 12.

The cylindrical means 94 is fixed to the hub means 36 through a threaded connection 98. This type connection permits the cylindrical body 94 to be constructed of the same or a different type of material than the hub means 36 depending upon the type hydraulic fluid used in the master cylinder 14.

The cylindrical means 94 has a flange 100 on the end thereof for dividing a large diameter portion 102 of the bore of the master cylinder 14 into a reservoir chamber 104 and an input chamber 106. The cylindrical means 94 has a stepped axial bore with a first section 108, in which the third bearing surface 92 of the plunger 62 is located, and a second section 110, into which a piston means 112 is located. A plurality of radial bores 114 connect the input chamber 106 with the interior of the second diameter section 110. A seal 116 located in bearing surface 118 prevents leakage from the input chamber 106 into the atmosphere through vent passage 120.

A deformable or reaction means 122 is located in the second diameter section 110 between the shoulder 124 and the piston means 112. The deformable means 122 is constructed of a material which will act as a solid during an initial operational sequence and as the operational forces and reactionary forces are increased, the elasticity of the material allows a uniform distribution of the force to be transmitted throughout the entire material. As an example, the reaction means 122 is a disc shown in FIG. 1, and is made of a buna N rubber.

The piston means 112 has a first diameter section 126 which extends into a small diameter 128 in the bore of the master cylinder 14 to estabish a pressurizing chamber 130. A first port 132 connects reserovir 134 with the pressurizing chamber 130 and a second port 136 connects the reservoir 134 with the reservoir chamber 104. The piston means 112 has a small diameter section 138 which fits into the second diameter 110 of the cylindrical means 94. An end cap 140 attached to the second diameter section 138 of the piston means 112 and a follower 142 on the control valve means 144 form a control chamber 146. The control chamber 146 is connected to the reservoir chamber 104 through passage 148 and to the input chamber 106 through passages 150 and 114.

A sleeve or actuator means 154 is located in bore 156 of the piston means 112. The sleeve means 154 has an axial passageway 158 which is in constant communication with the pressurizing chamber 130. A series of radial passages 160 in the sleeve means 154 and axial holes 162 in end plate 165 allow the hydraulic fluid in the pressurizing chamber 130 to surround the sleeve means 154. The follower 142 has a seal 152 which engages surface 164 on the end cap 140 to prevent communication of the hydraulic fluid surrounding the sleeve means 154 from entering the control chamber 146.

The follower 142 of the control valve means 144 has a face 168 with a resilient seal 166 located on the front side thereof adjacent the second passage 148 in the piston means 112. The face 168 and resilient seal 166 have a plurality of holes 170 located on a radii between a reservoir seat 172 and a pressure seat 174. A spring 176 located between the end cap 140 and face 168 urges the pressure seat 174 against shoulder 177 on the sleeve means 154 to prevent communication from the pressure chamber 130 into the control chamber 146.

A retainer means 178 located in the pressurizing chamber 130 has a plurality of legs 182 radially extending from a base member 180 to hold spring 188. The legs 182 contact face 184 of the large diameter section 126 of the piston means 112 and face 186 of the sleeve means 154. The spring 188, caged between a secondary piston 190 in bore 128 and the legs 182, urges the end cap 140 of the piston means 112 into engagement with the deformable means 122. Without a pressure force or signal in the pressurizing chamber 130, a first gap 192 occurs between the ends of the cylindrical means 94 and the large diameter section 126 of the piston means 112. At the same time, spring 176 urges follower 142 toward the shoulder 177 and moves face 186 of the sleeve means against legs 182 to develop a second gap 194 between end plate 165 and the reaction means 122.

A first return spring 196 located in the secondary pressure chamber 198 acts through the secondary piston 190 and spring 188 on piston means 112 to help the second return spring 200 in the first variable volume chamber 42 urge the hub means 36 against bumpers 202 (only one shown) on the rear shell 24.

MODE OF OPERATION OF THE PREFERRED EMBODIMENT

When a gasoline engine in a vehicle is operating, vacuum is producted at the intake manifold 206 and communicated through conduit 208 past check valve 210 into the first variable volume chamber 42. The vacuum in the first variable volume chamber 42 evacuates air from the second variable volume chamber 46 by flowing air through passage 84 into bore 54, around seat 86, and though passage 82, to suspend the wall means 44 in a vacuum.

When an operator desires to operate the brakes in the vehicle, an input force is applied to pedal 20. Pedal 20 pivots on pin 212 to provide push rod 58 with a linear input force which moves plunger 62 in bore 54 in opposition to return spring 74. Initial movement of plunger 62 permits spring 80 to move vacum seat 66 against the annular shoulder 86 and interrupt communication of vacuum into bore 54 through pasage 82. Further movement of plunger 62 moves the atmospheric seat 78 away from vacum seat 66 to permit atmospheric air in bore 54 to flow into the second variable volume chamber 46 through passage 84. With air in the second variable volume chamber 46 and vacuum in the first variable volume chamber 42, a pressure differential is created across wall means 44. This pressure differential causes the wall means 44 to move toward the first variable volume chamber 42 and create a first operational input force. This first operational input force is transmitted from the wall means 44 through shoulder 40 into the hub means 36 for distribution into the cylindrical means 94. The input force in the cylindrical means 94 is transmitted through the deformable or reaction means 122 into the end cap 140 of the piston means 112. This input force moves the piston means 112 past port 132 to develop an operational pressure signal in the pressurizing chamber 130. The operational pressure signal in chamber 130 is communicated to the front wheel brakes 16 and the secondary piston 190 which in turn supplies the rear wheel brakes 18 with an operational pressure signal.

The operational pressure signal in chamber 130 is communicated through passage 158 of the sleeve means 154, out the radial bores 160 and axial holes 162 to balance the pressure force acting on the sleeve means 154.

Figure 2:
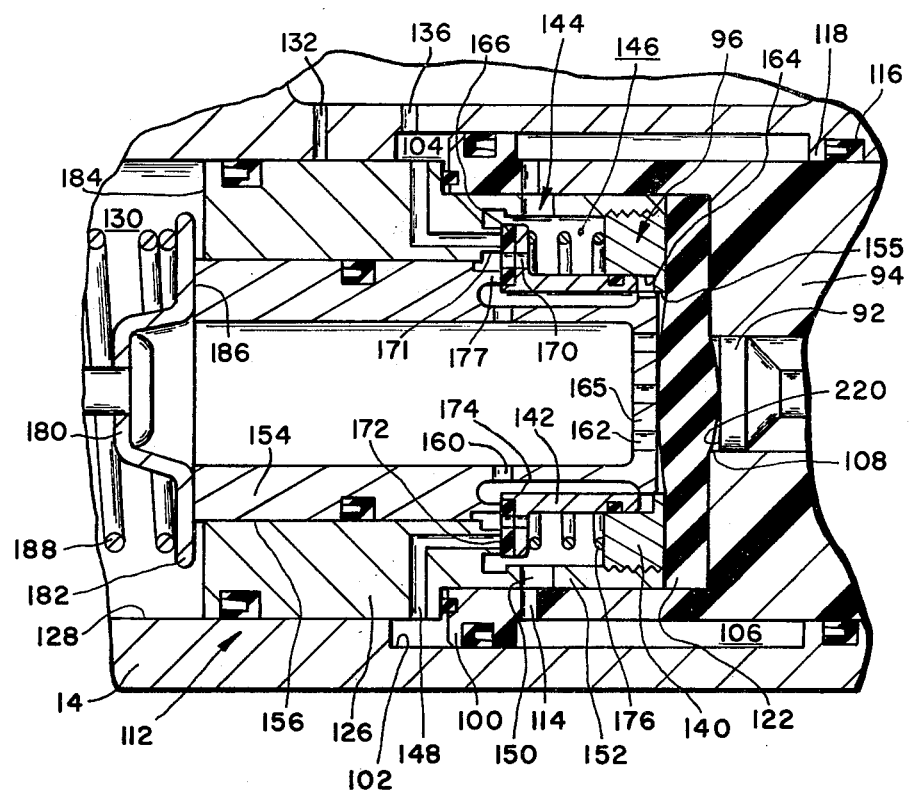
FIG. 2 is a sectional view of the reaction means of the two stage servomotor of FIG. 1 illustrating the relationship between the piston means, input means and the valve actuator means during a first mode of operation.

As the pressure in the pressurizing chamber 130 builds up, the pressure force acting on face 184 moves the piston means 112 toward the cylindrical means 94 to eliminate gap 192 by compressing the deformable or reaction means 122 adjacent the end cap 140. At the same time, the center section of the deformable means 122 flows into axial bore 108 of the cylindrical means 94 and into the axial bore 155 of the end cap 140. The deformable means 122 in the axial bore 108 contacts end 220 of the plunger means 62 and in axial bore 155 contacts end plate 165 to move the sleeve means 154 toward the pressurizing chamber 130, as shown in FIG. 2.

At this point in the mode of operation, spring 176 moves the reservoir seat 172 against shoulder 171 on the piston means 112 to prevent free communication of fluid from the reservoir chamber 104 into the control chamber 146.

Figure 3:
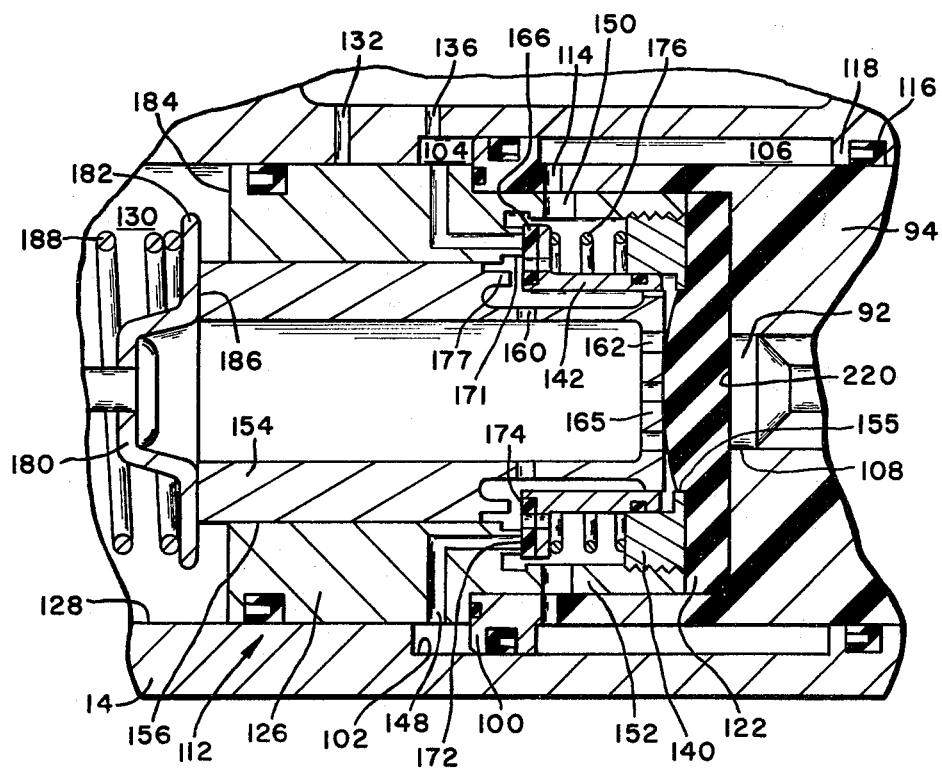
FIG. 3 is a sectional view of the reaction means of FIG. 2 illustrating a second mode of operation.

Thereafter, as shown in FIG. 3, any further input force applied to pedal 20 by the operator is transmitted from the push rod 58 into end 92 of the plunger 62. End 92 engages the reaction means 122 and moves shoulder 177 on the sleeve means 154 away from the pressure seat 174. With shoulder 177 separated from the pressure seat 174, the hydraulic pressure signal in the pressurizing chamber 130 is communicated through the control chamber 146 and into the input chamber 106 by way of passages 150 and 114. The hydraulic pressure signal in the input chamber 106 acts on rib 100 to provide a second or auxiliary force which moves the cylindrical means 94. This second input force and the input force developed by the wall means 44 is transmitted through the reaction means 122 causing the piston means 112 to move in bore 128 and further pressurize the hydraulic fluid in chamber 130.

Thus, I have provided a means of controlling the sequential operation of a two stage servomotor 12 as a function of the changes in shape of a reaction means 122.

I claim:

1. In a two stage servomotor for energizing the wheel brakes of a vehicle in a first stage with a fluid pressure created by moving a piston means in a pressurizing chamber of an actuator bore by a first input force and in a second stage by moving said piston means in the pressurizing chamber through a combined forced of a second input force and pressure force created by the fluid pressure acting on the piston means in an input chamber, actuation means for shifting the operation of said two stages servomotor from said first stage to said second stage, comprising:

cylindrical means associated with said piston means in said actuator bore for establishing said input chamber and a reservoir chamber, said cylindrical means having a passageway for connecting said input chamber with said pressurizing chamber and said reservoir chamber, said cylindrical means being responsive to said first and second input forces;

deformable means for transmitting said first and second input forces from the cylindrical means to said piston means, said first and second input forces and the fluid pressure in the pressurizing chamber causing said deformable means to change shape; and valve means located in said bore and responsive to said change in shape of said deformable means for preventing fluid communication through said passageway from said pressurizing chamber to said reservoir chamber and said input chamber while allowing fluid to be communicated from said reservoir chamber to said input chamber in said first stage of operation and for preventing fluid communication from said reservoir chamber to said pressurizing chamber and said input chamber when said fluid pressure in the pressurizing chamber reaches a predetermined value and thereafter allows fluid communication between said pressurizing and input chambers to initiate said second stage of operation, said fluid pressure communicated to said input chamber acting on a portion of said cylindrical means which in turn abuts the piston means to aid in the movement thereof.

2. In the two stage servomotor, as recited in claim 1, wherein said valve means includes:

sleeve means located in said actuator bore having a first section and a second section to establish a control chamber, said second section having a radial bore for connecting the interior of the sleeve with the control chamber, said first section being larger than said second section, said second diameter section contacting said deformable means and moving in said actuator bore in response to said change in shape.

3. In the two stage servomotor, as recited in claim 2, wherein said valve means further includes:

poppet means located in said control chamber; and resilient means for urging said poppet means against said sleeve means to prevent communication through said radial bore in the first stage of operation, and against the piston means to prevent communication through said passageway from said reservoir chamber in the second stage of operation.

4. In the two stage servomotor, as recited in claim 3, wherein said piston means and said sleeve means move relatively to each other as a function of said change in shape of said deformable means.

5. In the two stage servomotor, as recited in claim 4, wherein said sleeve means includes:
plate means attached to the end thereof having a plurality of holes therein for transmitting said pressure force to said deformable means to provide a pressure balance around said sleeve means to thereby limit movement of the sleeve means to said change in shape of the deformable means.

6. In the two stage servomotor, as recited in claim 5, further including:
retainer means having a base member located in said pressurizing chamber, said base member contacting said piston means to provide cooperation with a secondary piston means in said actuator bore, said resilient means acting through the poppet means to urge said sleeve means against said base member and create a gap between the plate means and the deformable means, said first input force being required to change the shape of the deformable means before any independent movement takes place between the piston means and the sleeve means to eliminate said gap.

7. In the two stage servomotor, as recited in claim 6, wherein said retainer means includes:
spring means for providing linkage between the piston means and the secondary piston means, said spring means acting on said sleeve means to hold said poppet means away from the piston means to prevent communication through said radial bore in the first stage of operation.

8. In a two stage servomotor for energizing the wheel brakes of a vehicle in a first stage of operation with a first pressure signal created from a first input force developed through the movement of a wall means, means for combining an additive input force with a second input force to create a second pressure signal in a second stage of operation, said combining means comprising:
a housing having a bore therein with a first section and a second section, said housing having a first port and a second port for connecting said first and second sections with a reservoir;
piston means located in said first section of said bore for establishing a pressurizing chamber, said piston means having a control chamber located therein, said piston means having a first passageway for connecting the control chamber with the pressurizing chamber, a second passageway and a third passageway in said piston means;
cylindrical means fixed to said wall means and located in said second section in said bore to establish a reservoir chamber and an input chamber, said input chamber being connected to said control chamber through said second passageway, said reservoir chamber being connected to said control chamber through said third passageway;
deformable means located in said bore for transmitting the first and second input forces from the cylindrical means to move said piston means in said pressurizing chamber past said first port and create said first and second pressure signals, said first and second input forces and first and second pressure signals causing said deformable means to change shape; and valve means connected to said control chamber and responsive to said change in shape of said deformable means for preventing communication through the first passageway from said pressurizing chamber to said reservoir and input chambers in the first stage of operation while allowing communication between the reservoir chamber and the input chamber through the control chamber and for preventing communication through the third passageway from the reservoir chamber to said input and pressurizing chambers when the first pressure signal in the first stage of operation reaches a predetermined value to allow communication of fluid between the pressurizing chamber and the input chamber through the control chamber, said fluid communicated to said input chamber acting on the cylinder means which in turn abuts the piston means to develop said additive input force.

9. In the two stage servomotor, as recited in claim 8, wherein said valve means includes:
sleeve means located in said bore second section having a shoulder separating a first section and a second section, said sleeve second section having a radial bore for connecting the interior of the sleeve with the control chamber, said first sleeve section being larger than said second sleeve section, said second sleeve section contacting said deformable means and moving in said bore second section in response to said change in shape.

10. In the two stage servomotor, as recited in claim 9, wherein said valve means further includes:
poppet means located in said control chamber; and
resilient means for urging said poppet means against said shoulder on the sleeve means to prevent communication through said radial bore in the first stage of operation, and against the piston means to prevent communication through the third passageway from said reservoir chamber in the second stage of operation.

11. In the two stage servomotor, as recited in claim 10, wherein said piston means and said sleeve means more relatively to each other as a function of said change in shape of said deformable means.

12. In the two stage servomotor, as recited in claim 11, wherein said sleeve means includes:
plate means attached to the end thereof having a plurality of holes therein for transmitting said pressure signal to said deformable means to provide a pressure balance around said sleeve means to thereby limit movement of the sleeve means to said change in shape of the deformable means.

13. In the power braking system, as recited in claim 12, wherein said servomotor further includes:
retainer means having a base member located in said pressurizing chamber, said base member contacting said piston means to provide cooperation with a secondary piston means in said bore first section, said resilient means acting through the poppet means to urge said sleeve means against said base member and create a gap between the plate means and the deformable means, said first input force being required to change the shape of the deformable means before any independent movement takes place between the piston means and the sleeve means to eliminate said gap.

14. In the power braking apparatus, as recited in claim 13, wherein said retainer means includes:

spring means for providing linkage between the piston means and the secondary piston means, said spring means acts on said sleeve means to urge said shoulder against said poppet means and holds said poppet means away from the piston means to prevent communication through said radial bore in the first stage of operation.

15. In a two stage servomotor for energizing the wheel brakes of a vehicle with an operational fluid pressure created by moving a piston means in a pressurizing chamber of a bore by a first input force in a first mode of operation and in a second mode of operation by moving the piston means by combining the forces of a second input force and a force created by the operational fluid pressure acting on a portion of the piston means in an input chamber, actuation means for shifting the operation of the two stage servomotor from the first mode to the second mode comprising:

cylindrical means located in said bore defining a reservoir chamber and an input chamber having a first passage for connecting the fluid reservoir chamber to a control chamber defined in said piston means, a second passage in said piston means for connecting the control chamber to the pressurizing chamber and a third passage in said cylinder means for connecting the control chamber to the input chamber;

deformable means for transmitting said first and second input forces to said piston means, said first and second input forces and the operational fluid pressure in the pressurizing chamber causing said deformable means to change shape; and valve means located in said control chamber and responsive to said change in shape of said deformable means for preventing communication from said pressurizing chamber to said reservoir chamber and said input chamber through said second passage while allowing communication from the reservior chamber to the input chamber through said first and third passages in said first mode of operation and in said second mode of operation preventing fluid communication from the reservoir chamber through said first passage to said pressurizing chamber and said input chamber when the fluid pressure in the outlet chamber reaches a predetermined value and thereafter allow fluid communication from the pressurizing chamber to the input chamber through the second and third passages, said fluid communicated from the pressurizing chamber to the input chamber acting on a portion of the cylindrical means which in turn abuts the piston means to aid in the movement thereof.

16. In the two stage servomotor, as recited in claim 15 further including:

sleeve means located in said piston means and having;
a first diameter section separated from a second diameter section by a shoulder;
said fluid pressure in said pressurizing chamber acting on said first diameter section to move said second diameter section into contact with said deformable means and said shoulder into contact with said valve means, said change in shape acting on said second section to move said shoulder away from said valve means to initiate said second mode of operation.

* * * * *